(12) United States Patent
Schuler et al.

(10) Patent No.: US 9,008,426 B2
(45) Date of Patent: Apr. 14, 2015

(54) GENERATING AN IMAGE PRESEGMENTED INTO REGIONS OF INTEREST AND REGIONS OF NO INTEREST

(75) Inventors: Pascal Schuler, Waldkirch (DE); Dietram Rinklin, Waldkirch (DE); Ulrich Zwolfer, Waldkirch (DE)

(73) Assignee: Sick AG, Waldkirch (DE)

( * ) Notice: Subject to any disclaimer, the term of this patent is extended or adjusted under 35 U.S.C. 154(b) by 284 days.

(21) Appl. No.: 13/564,394

(22) Filed: Aug. 1, 2012

(65) Prior Publication Data

US 2013/0033617 A1 Feb. 7, 2013

(30) Foreign Application Priority Data

Aug. 5, 2011 (EP) .................................... 11176650

(51) Int. Cl.
*G06K 9/00* (2006.01)
*G06T 7/00* (2006.01)
*G06K 9/20* (2006.01)

(52) U.S. Cl.
CPC ............ *G06T 7/0081* (2013.01); *G06K 9/2054* (2013.01); *G06T 2200/28* (2013.01)

(58) Field of Classification Search
CPC ...................................................... G06K 9/00
USPC .............. 235/454, 462.1, 462.41; 348/222.1, 348/345; 382/173, 181
See application file for complete search history.

(56) References Cited

U.S. PATENT DOCUMENTS

| | | | |
|---|---|---|---|
| 6,738,496 B1 | 5/2004 | Van Hall | |
| 6,837,431 B2 * | 1/2005 | Carlson et al. | 235/454 |
| 6,983,886 B2 * | 1/2006 | Natsukari et al. | 235/462.1 |
| 8,028,919 B2 * | 10/2011 | He | 235/462.41 |
| 8,687,105 B2 * | 4/2014 | Nakai et al. | 348/345 |
| 2011/0280464 A1 * | 11/2011 | Terada et al. | 382/132 |
| 2013/0033617 A1 * | 2/2013 | Schuler et al. | 348/222.1 |

OTHER PUBLICATIONS

Ehsan S. et al., "Exploring Integral Image Word Length Reduction Techniques for SURF Detector", Computer and Electrical Engineering, 2009 Second International Conference on Computer and Electrical Engineering, pp. 635-639, Dec. 28, 2009, XP031609787.
Crow F.C., "Summed-Area Tables for Texture Mapping", Computer Graphics, vol. 18, No. 3, pp. 207-212, Jul. 2004, XP-002495694.
European Examination Report in the counterpart European Application 11 176 650.7, three (3) pages.
European Search Report in the counterpart European Application 11 176 650.7, five (5) pages.

\* cited by examiner

*Primary Examiner* — Gregory M Desire
(74) *Attorney, Agent, or Firm* — Nath, Goldberg & Meyer; Jerald L. Meyer; Katelyn J. Bernier

(57) ABSTRACT

A camera system (10) is provided for generating an image presegmented into regions (106*a-b*) of interest and of no interest, having an evaluation unit (20) which is designed to divide the raw image into part regions (106*a-b*) to calculate a contrast value for each part region (106*a-b*) and to decide with reference to the contrast value whether the respective part region (106*a-b*) is a region of interest (106*a*) or a region of no interest (106*b*). In this respect, the evaluation unit (20) has a preprocessing unit (22) which is implemented on an FPGA, which respectively accesses the pixels of a part region (106*a-b*) and generates summed values (a), b) for the respective part region (106*a-b*) and has a structure recognition unit (24) which calculates the contrast value of the part region (106*a-b*) from its summed values (a, b) without accessing pixels of the part region (106*a-b*).

17 Claims, 2 Drawing Sheets

Figure 1:
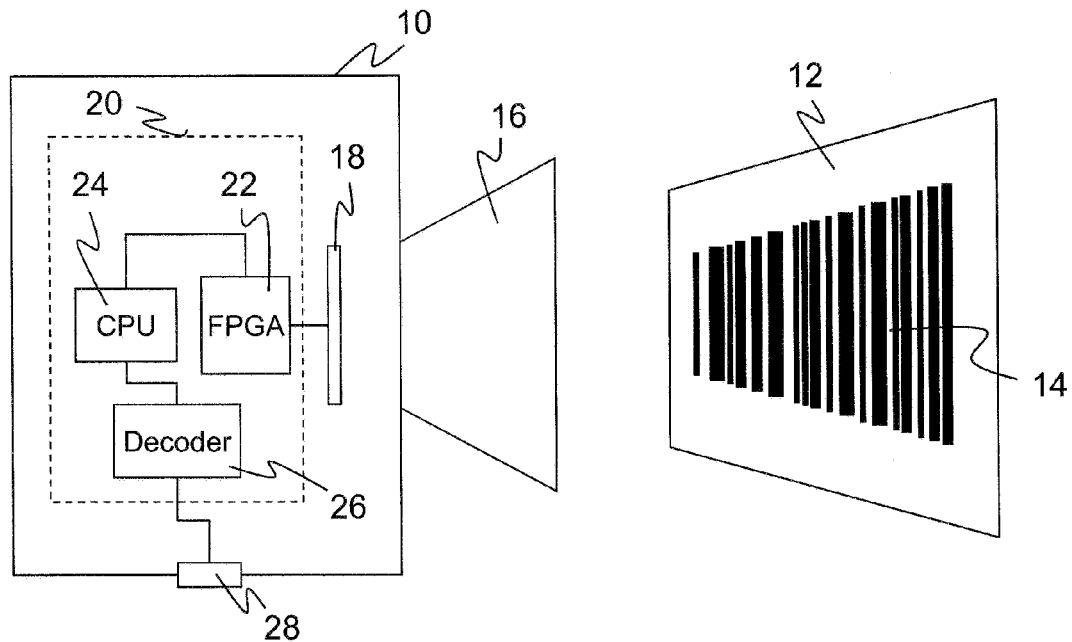

GENERATING AN IMAGE PRESEGMENTED INTO REGIONS OF INTEREST AND REGIONS OF NO INTEREST

The invention relates to a camera system for generating a presegmented image as well as to a method of presegmenting a raw image resolved into pixels into regions of interest and regions of no interest in accordance with the preamble of claims 1 and 12 respectively.

Camera systems deliver large amounts of image data, in particular when they are of high resolution. High computing and storage capacities are required to process them. Frequently, however, only part sections of the images are relevant and the image processing is substantially simplified by a limitation to such part sections.

A field of application for cameras is code reading. Here, with the further development of digital camera technology, camera-based systems are increasingly replacing the still widespread barcode scanners which scan a barcode using a laser beam transverse to the code. Code readers are used, for example, at supermarket check-outs, for automatic packet identification, for sorting postal shipments or in baggage handling at airports and in other logistics applications.

Instead of scanning code regions, a camera-based code reader takes images of the objects having the codes located thereon using a pixel-resolved image sensor. Subsequently, image evaluation software extracts the code information from these images. Camera-based code readers also cope without problem with different code types than one-dimensional barcodes which also have a two-dimensional structure like a matrix code and provide more information.

In a somewhat further sense, lettering also represents a code. To be able to read the lettering in an automated manner, text recognition programs (OCR, optical character recognition) are used. In the above-named logistics applications, such lettering is used instead of or in addition to classic barcodes or 2D codes.

In an important application group, the objects bearing the code are conveyed past the code reader. A line scan camera reads the object images having the code information successively and line-wise with the relative movement. So that the objects can be arranged in any desired orientation on the conveyor, a plurality of code readers are often provided to take objects from a plurality of sides or from all sides.

When a camera is used in the area of code reading or text recognition, those image regions in which codes or texts can be located form the regions of interest, whereas other image regions do not have to be further evaluated. If therefore the code regions and text regions are identified early in the processing chain, the image processing effort can be substantially reduced and the hardware requirements fall.

For this reason, the images read in by the camera are subjected to a presegmentation into regions of interest (ROI) and regions of no interest before the actual image processing. In the case of code reading, the regions of interest are characterized by clearly visible, that is high-contrast, structures since they are to be considered as potential code candidates. The degree of structure content of an image region is, however, also relevant in other image processing scenarios. For structureless, and thus largely homogeneous, image regions contain less evaluable image information and are therefore of less interest for most applications of image processing.

The presegmentation or image segmentation conventionally takes place by algorithms which run on a commercial processor (CPU). A high flexibility thereby admittedly arises for the implementation of different image processing processes. If, however, a fast system, or even a real-time enabled system, is required, such as in code reading at a conveyor belt, the running times on a processor are frequently too long. For the processor has to access each pixel of the image to be segmented and read out its pixel value or gray value for the correct presegmentation. A pixel access by the processor is, however, relatively slow and these numerous pixel accesses therefore result in an unacceptable running time or in very high demands on the computing capacity of the processor.

A real-time binarization of grey value images is known from U.S. Pat. No. 6,738,496 B 1. In this respect, a statistical preselection of tiles takes place with reference to the variance or using histograms. Only those tiles are binarized which have a higher variance after this preselection than predefined by a threshold. The image is thus presegmented in the desired manner, but this presegmentation makes exactly the just named demands on the processor which are too high.

It is therefore the object of the invention to enable an improved presegmentation of an image into regions of interest and regions of no interest.

This object is satisfied by a camera systems for generating an image presegmented into regions of interest and regions of no interest as well as by a method of presegmenting a raw image resolved into pixels into regions of interest and regions of no interest in accordance with claims 1 and 12 respectively. In this respect, the invention starts from the basic idea of first dividing the image into part regions without taking account of the image contents, for example into part regions whose size is fixed by parameters. The contrast is inspected for each part region. The time-consuming calculation of the contrast values is split into two steps. The numerous accesses to the individual pixels of the part regions take place upstream in an FPGA which consolidates the pixel information in summed values. Very fast simple operations, for example only additions, are sufficient for this purpose. The actual calculation of the contrast value then takes place downstream on the basis of the summed values outside the FPGA. No more pixel accesses are required in so doing. More powerful computing operations such as division or root extraction are available for this, with some few such operations applied to the summed values being sufficient to calculate the contrast value.

As a rule, it is the high-contrast image regions which are of interest so that part regions with a high contrast value are therefore classified as regions of interest and the other part regions are classified as regions of no interest. In this respect, contrast is to be understood in a wide sense as a measure for the structure in this part region. A uniform, that is structureless, part region is therefore to be understood as of low contrast. The specific border which separates high-contrast and uniform part regions depends on the application conditions.

The image sensor preferably delivers a gray value image in the case of code reading so that the pixel accesses therefore each deliver a number which stands for a brightness value or gray value.

The invention has the advantage that the presegmentation is considerably accelerated and simplified. A two-dimensional input image can thus be segmented fast and passed on to subsequent image processing steps. The strengths and weaknesses of the different architectures are advantageously utilized by a balanced share of work between the preprocessing unit and the structure recognition unit. The FPGA is suitable for fast pixel accesses and a fast carrying out of a large number of simple operations, but in contrast does not provide any more powerful computing operations. Conversely, the structure recognition unit can carry out practically any operation by flexible programming, but requires comparatively more computing time for highly repetitive operations such as pixel accesses or additions. Raw images or input images of any desired size can be presegmented very fast by the interaction of both elements in which the summed values serve as an interface. A substantial gain in running time is achieved over conventional purely CPU based processes, particularly with high resolution input images.

The structure recognition unit is preferably implemented on a microprocessor. In this respect, a microprocessor can be understood as any kind of digital component which is suitable for the flexible implementation of complex algorithms and computing operations. In principle, the microprocessor is also able to compute the summed values. Due to the slow pixel access in comparison with an FPGA, the part region would then, however, have to be underscanned for the same running time and computing capacity, that is only some of the pixels of the part region are used for the determination of the contrast value. This results in a less exact presegmentation.

The summed values preferably include a part region sum in which all the pixel values of a part region are added up and a part region square sum in which all squared pixel values of the part region are added up. The computation of these values requires only additions and a multiplication for squaring. The FPGA can thus calculate these values very efficiently, whereas they are at the same time very characteristic for the contrast in the part region.

The preprocessing unit is preferably designed to calculate an integral image of the raw image which holds the accumulated pixel values of a rectangle spanned by the pixel and by a corner of the raw image in each pixel. Part region sums of any desired rectangular sections can later be determined from such an integral image using a few additions and subtractions solely from the corner values of the sections. An integral image additionally serves as a basis for the further image processing using a series of filters.

The preprocessing unit is preferably designed to calculate the summed values in real time and to output an image to which the summed values for the part regions are added. The real-time evaluation is made possible by the work distribution between the preprocessing unit and the structure recognition unit. In the case of the embodiment as a line scan camera at a conveyor belt described in the introduction, real-time evaluation ("on the fly") specifically means that the read-in image lines are evaluated and the summed values of the associated part regions are updated while further image lines are still being read in. Directly after the image sensor has fully detected and image or an image section, the image processing steps carried out in real time have already been completed. In addition to the determination of the summed parameters, further real time processing steps can also be carried out, for example a real-time binarization or an image compression, specifically a JPEG compression, or generally a filtering. On the forwarding of the image data to downstream units, specifically to the structure recognition unit, the summed values are then attached to the image data, for example as additional image lines.

The structure detection unit is preferably designed to calculate the contrast value based on the variance or on the standard deviation of the pixel values of a part region. In the simples case, the variance or standard deviation is equated with the contrast value. The contrast value can, however, also be derived therefrom, for example as a multiple or as a fraction. It is furthermore conceivable that the variance or standard deviation is only one of a plurality of criteria for the decision whether a part region is classified as of interest or of no interest.

The structure detection unit preferably calculates the variance as the difference of the part region square sum divided by the pixel number of a part region minus the squared part region sum divided by the squared pixel number of the part region and/or the standard deviation as a root of the variance thus calculated. The standard deviation or variance is thus calculated from the summed values by a minimum number of computing operations so that only a little computing capacity of the structure recognition unit is required for this purpose.

The structure recognition unit preferably compares the contrast value of a part region with a minimum contrast threshold to decide whether the part region is a region of interest or a region of no interest. The minimum contrast threshold is in particular selected such that text regions or code regions are suspected in the part region when they are exceeded. The minimum contrast threshold is preferably intentionally set too low, for example to half the contrast value, in which text regions or code regions are suspected. In this manner, ultimately too many part regions are classified as of interest and thus more effort arises. This error can, however, be tolerated more than errors of the other kind, namely incorrect readings or non-readings due to part regions falsely classified as of no interest.

The structure recognition unit is preferably designed in a label image with a pixel used as a flag to set the flag per part region in dependence on a decision using the contrast value to a value for a region of interest or to a value for a region of no interest. The result of the presegmentation is thus, on the one hand, the actual image, and on the other hand, the label image from which it can be read out directly for each part region whether this part region is of interest and should thus still be taken into account in the downstream image processing.

The part regions are preferably rectangular part regions, in particular rectangular part regions of mutually the same size. Such part regions are also called tiles. The dimensions of the part regions are preferably parameterizable, but are fixed for the respective presegmentation. The FPGA is thus also aware of the borders of the part regions and can determine the summed values in real time. Tiles are suitable image sections both for the presegmentation and for the downstream image evaluation.

In an advantageous further development, a camera-based code reader has one of the previously described camera systems and a decoding unit which is designed to search for codes in the regions of interest, to ignore regions of no interest and to decode located codes. The presegmentation is thus advantageously used for an efficient and high-quality code reading. In this respect, the code reader and in particular its decoding unit can be designed to read ID codes, that is barcodes, 2D codes of any desired standard and text regions (OCR).

The method in accordance with the invention can be further developed in a similar manner and shows similar advantages in so doing. Such advantageous features are described in an exemplary, but not exclusive manner in the subordinate claims dependent on the independent claims.

Figure 2:
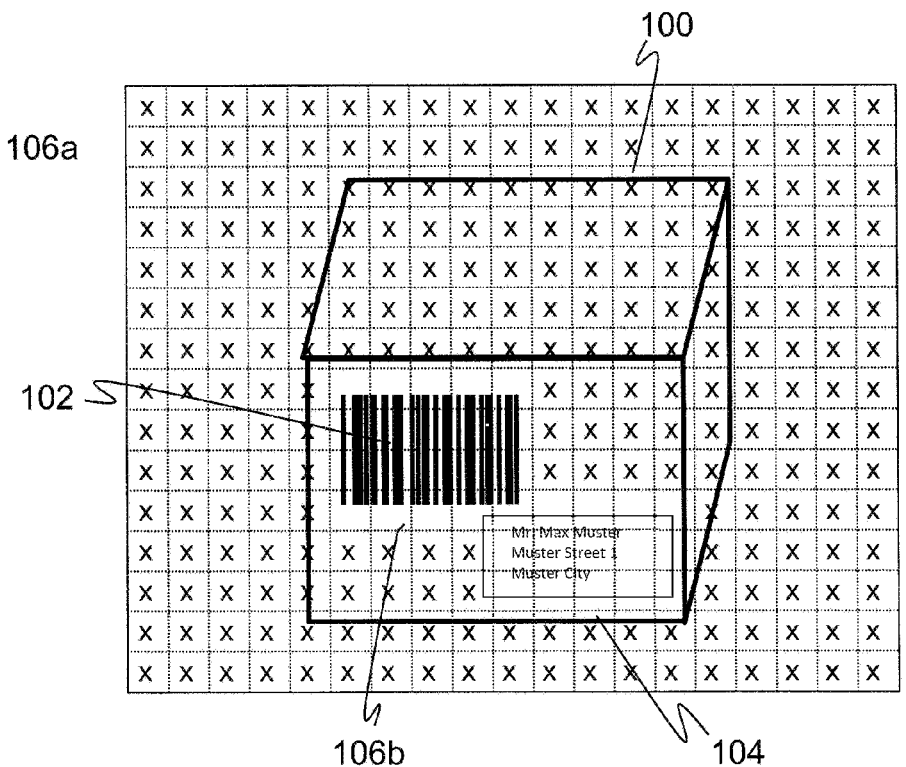
Figure 3:
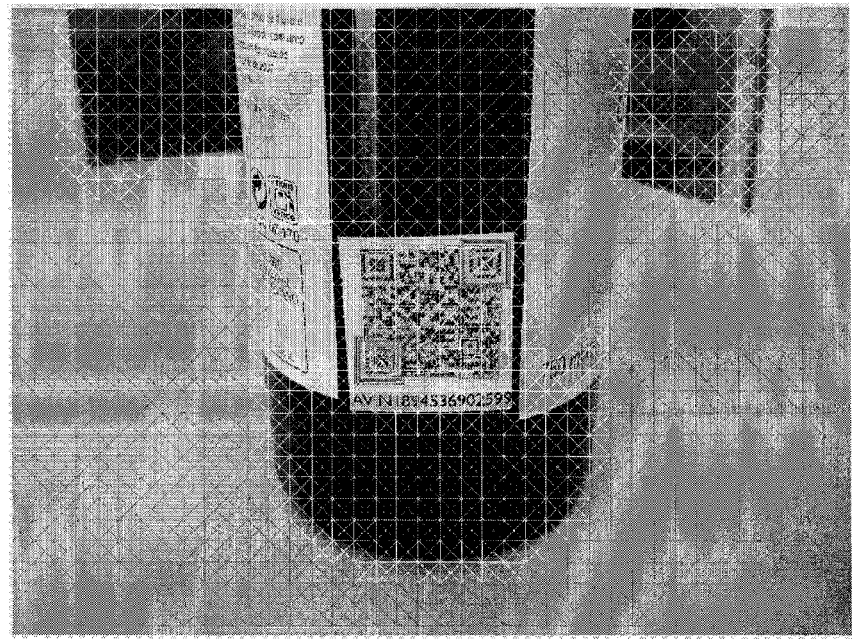
Figure 4:
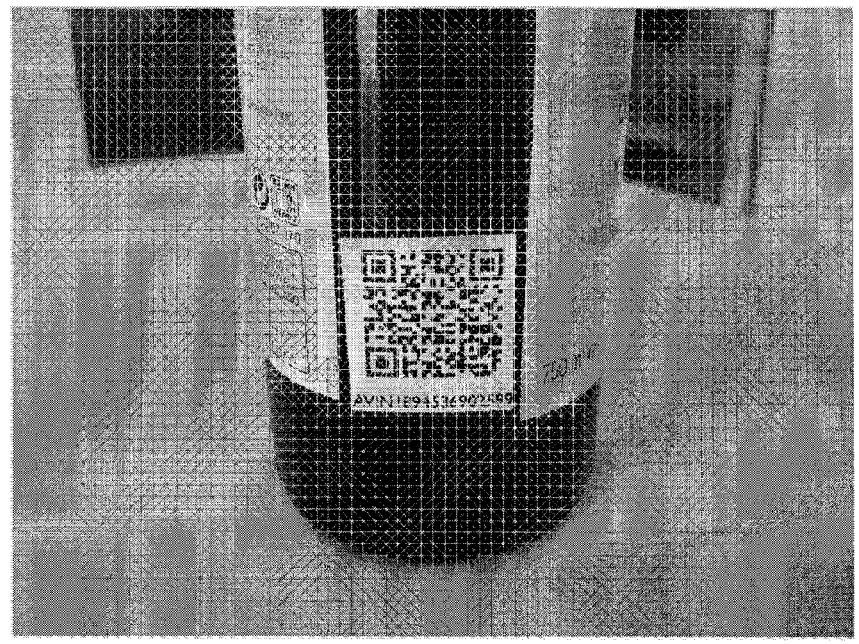

The invention will be explained in more detail in the following also with respect to further features and advantages by way of example with reference to embodiments and to the enclosed drawing. The Figures of the drawing show in:

FIG. 1 a block diagram of a camera-based code reader with elements for a presegmentation;

FIG. 2 a schematic example image taken by a camera system in accordance with FIG. 1 and presegmented;

FIG. 3 a real example image after presegmentation at a first setting of tile size and minimum contrast threshold; and FIG. 4 a real example image after presegmentation at a second setting of tile size and minimum contrast threshold.

FIG. 1 shows a block diagram of a camera system in an embodiment as a camera-based code reader 10. The code reader 10 detects a taking region 12 in which codes 14 may be located via a taking objective 16 only shown very schematically. An image sensor 18, for example a CCD chip or CMOS chip having a plurality of pixel elements arranged to form a row or a matrix generates image data of the taking region 12 and passes them on as a raw image or as an input image to an evaluation unit designated as a whole by reference numeral 20.

The evaluation unit 20 includes a preprocessing unit 22 which is implemented on an FPGA as well as a structure recognition unit 24 and a decoding unit 26 which are implemented, for example, on a respective microprocessor or on a common microprocessor.

The preprocessing unit 22 and the structure recognition unit 24 together generate in a manner described in more detail further below a presegmented image which is shown in an exemplary manner and only very schematically in FIG. 2. The input image contains a packet 1090 having two exemplary kinds of coding, namely a barcode 102 and a lettering 104. The aim of the presegmentation is to recognize those image regions as of interest in advance in which codings might be present and to mark other image regions as of no interest.

The presegmented example image of FIG. 2 is divided into a plurality of rectangular part regions or tiles 106a-b. Tiles 106a which are considered as regions of interest are shown blank. In contrast, tiles 106b which are considered as regions of no interest show a cross. As can easily be recognized, the tiles blank 106a contain all evaluable code information 102, 104, while the image region taken up by them is greatly reduced with respect to the total image. The criterion for the selection of regions of interest and of no interest is the contrast or the structure within the tile 106a-b. Homogeneous tiles 106b have no structure at all. A certain structure is present at the edges of the packet 100. The distinguishing criterion between regions of interest and regions of no interest is, however, set in the example of FIG. 2 so that the structure of the edges of the packet 100 is not sufficient to mark its tiles 106b as of interest.

Image processing steps, for example the decoding in the decoding unit 26, downstream of the presegmentation are concentrated solely on the tiles 106a marked as of interest. Code regions are only looked for and decoded there using further, now more accurate and more complex processes. The result is made available in dependence on the application as clear text together with the presegmented image, the raw image or other combinations of the detected image information at an output 28. The evaluation unit 20 and its components can, contrary to FIG. 1, also be fully or partly arranged outside of the code reader 10. In other image processing applications without code reading, the decoding unit 26 is missing; however, other units can instead be provided for further processing.

In the presegmentation, the structure recognition unit 24 is relieved of all the pixel accesses by the FPGA of the preprocessing unit 22. The microprocessor of the structure recognition unit 24 itself accordingly does not have to carry out any pixel access during the presegmentation.

The input image is first divided into individual tiles, preferably square tiles, of a parameterizable value. The standard deviation of the pixel values, in particular the gray values of the tile, are used as the criterion for distinguishing between image regions of interest and image regions of no interest. A small standard deviation in a region implies a homogeneous, uniform and thus low-structure region which is therefore actually of no interest for code reading in the further image processing chain. A high standard deviation, in contrast, indicates a structure which corresponds to a code with a considerably increased probability. The standard deviation is therefore in each case compared with a parameter which ensures a sufficient structure within the tile and is called a minimum contrast threshold.

The preprocessing unit 22 should take over the task of determining the standard deviation of each tile because numerous pixel accesses are required for this purpose. However, mathematical operations such as division and extraction of roots are in addition required for this which can only be implemented with a very high running time effort on an FPGA. The preprocessing unit 22 therefore only provides preparatory operations and determines summed parameters which are offset against the standard deviation by the structure recognition unit 24 without any pixel accesses of its own using a few, higher mathematical operations. The effort both in the preprocessing unit 22 and in the structure recognition unit 24 is thus minimized.

The calculation of the standard deviation is suitably reformulated for this type of calculation. For this purpose, let n be the number of pixels or picture elements in a tile, $x_i$ the individual gray values of the pixels, m their mean value and $\sigma$ their standard deviation. The number n of the pixels of a tile is preferably parameterizable, but is known and constant for the specific calculation both in the preprocessing unit 22 and in the structure recognition unit 24.

It then applies:

$$m = \frac{1}{n}\sum_{i=1}^{n} x_i,$$

$$\sigma^2 = \frac{1}{n}\sum_{i=1}^{n}(x_i - m)^2 = \frac{1}{n}\left(\sum_{i=1}^{n} x_i^2 - 2m\sum_{i=1}^{n} x_i + nm^2\right).$$

A part region square sum a is now defined as the sum of the squares of all the pixel values of a tile and a part region sum b as the sum of all the pixel values in a tile, i.e.

$$a = \sum_{i=1}^{n} x_i^2,$$

$$b = \sum_{i=1}^{n} x_i.$$

With the two summed parameters a, b, the calculation of the mean value is simplified to m=b/n. If in turn the above-given calculation rule is applied to the standard deviation, the following results after reforming $$\sigma = \sqrt{\frac{a}{n} - \frac{b^2}{n^2}}.$$

The two summed values a, b can be calculated fast and efficiently in the FPGA of the preprocessing unit 22 on the basis of very simple operations, namely only additions and multiplications and no divisions or the like. In contrast, no pixel access is required on the side of the structure recognition unit 24 to calculate the standard deviation of a tile 106a-b.

The summed values a, b can moreover also be calculated in real time, i.e. on the fly, during the reading of an input image since no dependencies between the read in pixel values have to be considered, but rather ultimately only intermediate sums have to be updated. The preprocessing unit 22 can also calculate the summed values a, b simply in addition to other real time preprocessing processes, for example in addition to a filtering, a binarizing or an image compression. The summed values a, b for each tile are attached to the forwarded input image, for example as additional lines, for forwarding to the structure recognition unit 24.

The structure recognition unit 24 stores the information whether a tile 106a-b is a region of interest or a region of no interest, in a label image, for example. This is a data region from a plurality of flags which are arranged two-dimensionally and can therefore be understood as pixels of the label image. The number of flags in width and height corresponds precisely to the number of tiles in the respective directions. The flags can be preset with a value; for example, all tiles 106a-b are initially marked as regions of interest.

For the assignment of the tiles 106a-b as regions of interest or of no interest, the structure recognition unit 24 first extracts the summed parameters a, b from the end of the input image. The standard deviation of the tile is then calculated for each tile from the summed parameters a, b in accordance with the above-given formula. This standard deviation is compared with a minimum contrast threshold. In this respect, the minimum contrast threshold corresponds to a desired search contrast of regions of interest or to a fraction thereof, for example to half. The tile is marked as of no interest in the label image via the associated flag for each tile in which the standard deviation falls below the minimum contrast threshold. Provided that the flags are not preset, the tile is conversely marked as of interest in the label image via the associated flag on an exceeding of the minimum contrast threshold.

In following processing steps, in particular in the decoding unit 26, a check is now made for each tile 106a-b with reference to the flag in the label image whether this tile is a region of interest. If this is not the case, the respective tile is ignored. An efficient and fast coarse segmentation is thus achieved which substantially accelerates the downstream image processing.

FIGS. 3 and 4 show real example images of an object with a code region taken by a camera system working in accordance with the invention after the presegmentation. In this respect, larger tiles and a lower minimum contrast threshold are set in FIG. 3 than in FIG. 4. The homogeneous image regions outside the object, but also uniform part regions of the object itself, are marked as of no interest in both cases in that the tiles are marked by a huge cross. The code regions with large structuring to be filtered out are marked as of interest in both cases in that the tiles are marked by a brighter, weaker cross.

In the case of the smaller minimum contrast threshold in accordance with FIG. 3, however, the structure transition between the object and the background is also sufficient in some regions to mark the respective tiles as regions of interest. A balance suitable for the application between a selection which is as strong as possible and the avoidance of a sorting out of code regions can thus be achieved by setting the minimum contrast threshold. It is determined by means of the tile size how fine the window should be within which a search should be made for a sufficient structure in each case. A more accurate adaptation of the total area of the regions of interest is thus made possible, on the one hand. On the other hand, the grain of the tile size also has an effect on the size of the structures for which a search is made and thus on the localizing of a suitable minimum contrast threshold with a high selectivity for code regions and other image regions.

The invention claimed is:

1. A camera system (10) for generating an image presegmented into regions (106a-b) of interest and of no interest, comprising:
an image sensor (18) for taking a raw image resolved into pixels and
an evaluation unit (20) configured to divide the raw image into part regions (106a-b), configured to calculate a respective contrast value for each part region (106a-b) and configured to decide whether each part region (106a-b) is either a region of interest (106a) or a region of no interest (106b) based on the respective contrast value,
wherein the evaluation unit (20) has a preprocessing unit (22), which is implemented on an FPGA, configured to access the respective pixels of a part region (106a-b) and configured to generate respective summed values (a, b) for the part region based on the respective pixels; and
wherein the evaluation unit further has a structure recognition unit (24) configured to calculate the respective contrast value for the part region (106a-b) based on the respective summed values (a, b) without accessing the respective pixels.

2. A camera system (10) in accordance with claim 1, wherein the structure recognition unit (24) is implemented on a microprocessor.

3. A camera system (10) in accordance with claim 1, wherein the summed values (a, b) include a part region sum (b) in which all the pixel values of a part region (106a-b) are added up and a part region square sum (a) in which all squared pixel values of the part region (106a-b) are added up.

4. A camera system (10) in accordance with claim 1, wherein the preprocessing unit (22) is configured to calculate an integral image of the raw image, which holds accumulated pixel values of a rectangle spanned by the pixel and by a corner of the raw image in each pixel.

5. A camera system (10) in accordance with claim 1, wherein the preprocessing unit (22) is configured to calculate the summed values (a, b) in real time and configured to output an image to which the summed values (a, b) for the part regions (106a-b) are added.

6. A camera system (10) in accordance with claim 1, wherein the structure recognition unit (24) is configured to calculate the respective contrast value based on the variance or on the standard deviation of the pixel values of a part region (106a-b).

7. A camera system (10) in accordance with claim 6, wherein the structure recognition unit (24) calculates the variance as a difference of the part region square sum (a) divided by the pixel number (n) of a part region (106a-b) minus the squared part region sum ($b^2$) divided by the squared pixel number ($n^2$) of the part region (106a-b) and/or the standard deviation as a root of the variance thus calculated.

8. A camera system (10) in accordance with claim 1, wherein the structure recognition unit (24) compares the respective contrast value of a part region (106a-b) with a minimum contrast threshold to decide whether the part region (106a-b) is a region of interest (106a) or a region of no interest (106b).

9. A camera system (10) in accordance with claim 1, wherein, in a label image with a pixel used as a flag, the structure recognition unit (24) is configured to set the flag per part region (106a-b) to a value for a region of interest (106a) or to a value for a region of no interest (106b) depending on a decision using the respective contrast value.

10. A camera system (10) in accordance with claim 1, wherein the part regions (106a-b) are rectangular part regions (106a-b).

11. A camera system (10) in accordance with claim 10, wherein the rectangular part regions (106a-b) are mutually of the same size.

12. A camera-based code reader (10) comprising:
a camera system for generating an image presegmented into regions (106a-b) of interest and of no interest having
an image sensor (18) for taking a raw image resolved into pixels,
an evaluation unit (20) configured to divide the raw image into part regions (106a-b), configured to calculate a respective contrast value for each part region (106a-b) and configured to decide whether each part region (106a-b) is either a region of interest (106a) or a region of no interest (106b) based on the respective contrast value, and
a decoding unit (26) configured to search for codes in the regions of interest (106a), configured to ignore regions of no interest (106b) and configured to decode located codes (102, 104).

13. A method of presegmenting a raw image resolved into pixels into regions (106a-b) of interest and of no interest, comprising:
dividing the raw image into part regions (106a-b),
calculating a respective contrast value for every part region (106a-b), and
deciding whether each part region (106a-b) is a region of interest (106a) or a region of no interest (106b) based on the respective contrast value,
wherein a preprocessing unit (22), implemented on an FPGA, accesses the respective pixels of a part region and generates summed values (a, b) for the part region (106a-b) based on the respective pixels; and a structure recognition unit (24), implemented on a microprocessor, calculates the respective contrast value for the part region based on the summed values (a, b) without accessing the respective pixels.

14. A method in accordance with claim 13, wherein the respective contrast value is calculated based on the variance or on the standard deviation of the respective pixel values of a part region (106a-b), and wherein the variance is calculated as a difference of a part region square sum (a) in which all squared pixel values of the part region (106a-b) are added up, divided by the pixel number (n) of a part region (106a-b) minus the squared part region sum ($b^2$) in which all the pixel values of a part region (106a-b) are added up, divided by the squared pixel number ($n^2$) of the part region (106a-b) and/or the standard deviation as the root of the variance thus calculated.

15. A method in accordance with claim 13, wherein the respective contrast value of a part region (106a-b) is compared with a minimum contrast threshold to decide whether the part region (106a-b) is either a region of interest (106a) or a region of no interest (106b), and wherein a pixel respectively used as a flag of a label image with one pixel per part region (106a-b) is set to a value for a region of interest (106a) or for a region of no interest (106b).

16. A method in accordance with claim 15, wherein said value is set in accordance with the decision.

17. A method in accordance with claim 13, wherein a search is made for codes (102, 104) in the presegmented image, where the regions of interest (106a) are investigated for codes (102, 104) and the regions of no interest (106b) are ignored, and wherein located codes (102, 104) are decoded.

* * * * *